(12) United States Patent
Melder et al.

(10) Patent No.: US 6,784,902 B1
(45) Date of Patent: Aug. 31, 2004

(54) METHOD FOR CONFIGURATION AND PARAMETERIZATION OF A GRAPHICAL COMPUTER PROGRAM FOR THE OPERATION OF A DATA PROCESSING SYSTEM

(75) Inventors: Wilfried Melder, Aachen (DE); Thomas Dieter Becker, Herzogenrath (DE)

(73) Assignee: National Instruments Corporation, Austin, TX (US)

( * ) Notice: Subject to any disclaimer, the term of this patent is extended or adjusted under 35 U.S.C. 154(b) by 588 days.

(21) Appl. No.: 09/648,927

(22) Filed: Aug. 25, 2000

(30) Foreign Application Priority Data

Sep. 4, 1999 (DE) .......................................... 199 42 315

(51) Int. Cl.[7] .............................................. G09G 5/00
(52) U.S. Cl. ..................................... 345/771; 345/853
(58) Field of Search ................................ 345/733, 734, 345/810, 863, 866, 735, 736, 737, 738, 739, 766, 776, 853, 712, 855, 771, 731

(56) References Cited

U.S. PATENT DOCUMENTS

| | | | |
|---|---|---|---|
| 4,860,204 A | | 8/1989 | Gendron et al. |
| 4,901,221 A | | 2/1990 | Kodosky et al. |
| 5,099,413 A | | 3/1992 | Sakai |
| 5,255,363 A | | 10/1993 | Seyler |
| 5,377,318 A | | 12/1994 | Wolber |
| 5,408,603 A | * | 4/1995 | Van de Lavoir et al. ... 345/763 |
| 5,465,215 A | * | 11/1995 | Strickland et al. .......... 700/180 |
| 5,544,300 A | * | 8/1996 | Skarbo et al. ............... 345/759 |
| 5,758,122 A | * | 5/1998 | Corda et al. ................. 717/125 |
| 5,760,788 A | * | 6/1998 | Chainini et al. ............ 345/474 |
| 5,910,803 A | * | 6/1999 | Grau et al. .................. 345/734 |
| 6,437,811 B1 | * | 8/2002 | Battles et al. ............... 345/835 |
| 6,496,208 B1 | * | 12/2002 | Bernhardt et al. .......... 345/853 |
| 6,535,227 B1 | * | 3/2003 | Fox et al. .................... 345/736 |
| 6,628,302 B2 | * | 9/2003 | White et al. ................. 345/717 |
| 6,690,981 B1 | * | 2/2004 | Kawachi et al. .............. 700/83 |

FOREIGN PATENT DOCUMENTS

| | | |
|---|---|---|
| DE | 40 12 790 | 10/1991 |
| DE | 198 03 263 | 8/1998 |

OTHER PUBLICATIONS

German Search Report, Application No. 199 42 315.6, mailed Aug. 17, 2000.

Catalano, Michael A. and Michael J. Charland, "The Use of Touchsensitive Video Displays in On Line Control Systems," IEEE IECON '83 Proceedings, Annual Conference on Industrial Electronics in San Fransisco, California, Nov. 7–11, 1983, pp. 1–6.

(List continued on next page.)

*Primary Examiner*—Kristine Kincaid
*Assistant Examiner*—Thanh T Vu
(74) *Attorney, Agent, or Firm*—Meyertons Hood Kivlin Kowert & Goetzel, P.C.; Jeffrey C. Hood

(57) ABSTRACT

A graphical program development system for developing a graphical program, wherein the development system utilizes a configuration matrix for representing the graphical program. The matrix may graphically illustrate or specify the operation of the computer program. The matrix may comprise columns (or rows) displayed on the display device, including one or more columns which comprise symbols for functional elements and one or more interconnection columns that include interconnections between two or more of the symbols for functional elements. Once the matrix (the computer program) has been created, the computer program may be executed, wherein the computer program executes according to the interconnected symbols for functional elements displayed in the matrix.

40 Claims, 7 Drawing Sheets

OTHER PUBLICATIONS

Melder, Wilfried and Ralf Muller, "Rationell Automatisieren Mit Vorgefertigter PC–Software," Automatisierungstechnische Praxis—ATP, Oldenbourger Verlag, Munchen, DE, vol. 38, No. 10, Oct. 1, 1995, pp. 54–58.

A. Sicheneder et al., "A Framework for the Graphical Specification and Execution of Complex Signal Processing Applications," Proceedings of the 1998 IEEE International Conference in Seattle, Washington, May 12–15, 1998, pp. 1757–1760.

"Level Management of Connections and Objects in a Visual Constructor," *IBM Technical Disclosure Bulletin*, vol. 39, No. 3, Mar. 1, 1996, 1 page.

Robillard, Pierre N. and Mario Simoneau, "Iconic Control Graph Representation," *Software Practice and Experience*, vol. 23, No. 2, Feb., 1993, pp. 223–234.

International Search Report, Patent Application No. 00119103.0–1243–, mailed Feb. 24, 2004.

* cited by examiner

METHOD FOR CONFIGURATION AND PARAMETERIZATION OF A GRAPHICAL COMPUTER PROGRAM FOR THE OPERATION OF A DATA PROCESSING SYSTEM

The invention pertains to a method for the configuration and parameterization of a graphical computer program, such as for the operation of a data processing system. The data processing system contains at least one data processor, one data memory, one input device and one display device. The program controls functional elements comprising, on one hand, of devices which are connected to the data processor via signal or data interfaces and, on the other hand, functional units which are emulated by a software module. The invention also pertains to a computer program for carrying out such a method.

Data processing systems are used in numerous technical fields, in particular, for the acquisition of measurement data at test stands, for the monitoring of process data in chemical systems, for quality monitoring in mechanical manufacturing systems, etc. Modern data processing systems typically utilize a computer with a data processor, a data memory, and an input device (keyboard, computer mouse, trackball or the like), as well as a display device, usually a monitor. The functional elements of a measurement or automation system may comprise data acquisition devices, e.g., measuring sensors, devices for reading data carriers (CD-ROM drive, diskette drive or the like), mechanical scanning devices, optical measuring devices, etc. Such data acquisition devices are usually connected to signal interfaces of the computer via signal lines. The signal interfaces can be configured for the transmission of digital signals if the external data acquisition device or measuring device digitizes the acquired signals. If the external data acquisition device supplies an analog signal, e.g., when using temperature sensors or microphones, the interface is realized in the form of an analog signal input. The received analog signal is converted into a digital signal by means of a data processor that is usually part of an analog/digital converter within the computer, and forwarded (e.g., to a data memory).

The functional elements may also contain additional signal sources such as, e.g., a clock signal generator, which defines a certain time cycle, or a trigger, which supplies a trigger signal when another signal exceeds a certain threshold value.

The functional elements may also contain devices for converting and additionally processing data and signals. For example, signals recorded by means of a signal recording device can be scaled and transformed. Depending on the intended use, other data transformation methods can be used.

Finally, the functional elements contain data memories for storing a selected portion of the recorded data as well as display devices for displaying a certain image of the recorded signals and data.

The individual functions of the functional elements were initially fulfilled by separate devices that were coupled to one another via electrical signal lines. With the increasing capability of modern computers, many of the functions of the functional elements can be emulated within the computer by means of software modules and, if necessary, in cooperation with the required hardware components in the computer. For example, so-called transient recorders for recording and storing a large quantity of digitized signals can be eliminated, due to the continuously increasing capacity of the main memories (RAM) and the hard disk drives in the computers. Due to the increasing computing power of the data processor, external FFT analyzers can be eliminated and the Fourier transform can be carried out within the computer by the data processor with the aid of a software module. Special processors, e.g., mathematical coprocessors, can be integrated into the computer if it is necessary to carry out complex mathematical transformations.

The increasing capacity of hardware has led to an integration of computers into the measurement chain. This integration has resulted in the fact that conventional interconnections of the functional elements can be realized by electrically conductive signal lines. In addition, the separate arrangement of display devices and operating elements can be replaced in ever more instances by direct connections to the computer, since, in many cases, the computer can integrate operating elements and a display device into one unit, and it is able to fulfill this task for several devices or functions simultaneously.

The emulation, configuration and interconnection of the various functional elements was initially realized by means of computer programs prepared as text in customary programming languages, such as FORTRAN, PASCAL, etc. Such a configuration of a measurement or control computer required comprehensive knowledge of the respective programming language. In addition, comprehensive knowledge regarding the design of the computer as well as the devices connected to the computer was required to read signals present at the different interfaces by means of the data processing program and to control the devices that are connected to the computer via the interfaces.

The disadvantage of known programming languages is that it is difficult to ascertain the functional interconnections between the different functional elements of the system from the program. The functional interconnections were usually outlined, before the program was written, in a graphical fashion in the form of easy-to-understand flow charts. After the system requirements were defined by means of the flow chart, the required command sequences were written in an arbitrary text-based programming language by a programmer and the resulting computer program was compiled.

With the increase in capability for producing graphic illustrations at the beginning of the 1980s, data flow charts were preferably prepared on the display devices of computers with a suitable program module, a data flow chart editor. It was later recognized that the information content in a data flow chart prepared on a computer display did not necessarily have to be converted into textual program code by a programmer, but rather it could be used by the computer to create a computer program that operates according to the data flow chart. Thus, the authors Davis and Keller disclosed the possibility of specifying programs by using editors for data flow charts in the article "Data flow program graphs" in IEEE Computer, February 1982. Similar embodiments are described in the article "PICT:AN Interactive Graphical Programming Environment" by the authors Glienert and Tanimoto in IEEE Computer, November 1984. U.S. Pat. No. 4,901,221 (European Patent EP 0 242 131 B1) discloses a practical application of such graphical programming languages. In this case, a separate computer program may be prepared for each special application by means of the graphical programming language. For this purpose, the graphical programming language may represent the directional data flow from one functional element to another functional element, and it may represent the program control. In order to attain the latter objective, graphic illustrations of the control functions of the program, i.e., iterative and conditional functions, may be incorporated into the graphical programming language.

Due to further increase in storage capacity and computing speed of computers, a similar program concept was introduced on the market that contains a fixed algorithm. This algorithm contains software modules for all functional elements of the program as well as a program core that carries out the initialization of the drivers, devices, etc., the measurement loop itself (starting the signal recording, executing the mathematical signal conversion and storage/display) as well as the measurement post-processing. This fixed program can be adapted to the respective measuring task without altering the executable program code by simply changing certain parameters. Until now, parameterization was realized with a signal wiring diagram that contained different graphic symbols (pictographs) for different functional elements and their interconnections to one another, and thus, this wiring diagram exhibits a certain similarity to a data flow chart. The line symbols may represent a directional data flow, i.e., the data connections between the different devices or functional elements. However, the signal wiring diagram may lack the control structures (program loops, conditional commands, etc.) which may be utilized by a programming language. The data is stored in buffer memories by the fixed program algorithm and can be retrieved—even multiple times—by arbitrary elements.

In smaller and clearly structured data processing systems, the data flow diagrams or charts of graphical programming languages or the similar wiring diagrams of the fixed program algorithms make it possible to significantly simplify the required design and configuration of the system. Modern data flow charts or diagram editors make it possible for experienced users to very quickly define and interconnect functional elements required for a certain task, in particular in the fields of metrology and system monitoring.

However, data flow charts or similar signal wiring diagrams have certain disadvantages, in particular, in the illustration of complex and not easily traceable systems. In data flow charts, as a rule, there is great freedom in the arrangement of symbols (also referred to as pictographs or icons) for the different functional elements. The user begins with an arbitrary symbol and adds additional symbols depending on the respective requirements. The location at which additional symbols are arranged is usually defined arbitrarily, and may not be associated with the interconnection of symbols to one another.

Different symbols can be connected to one another by means of connecting arcs or connecting lines. Connecting arcs extend from one symbol of a signal transmission channel of a first functional element to another symbol of either the same functional element or another functional element. Each symbol of a functional element within a data flow chart may contain several signal transmission channel symbols. For example, if the deviation between a nominal value and a control variable as well as the calculation of the correcting variable should be carried out by only one functional element, two signal transmission channel symbols for the signal inputs and one single transmission channel symbol for the signal output are required. As a rule, the connecting arcs in data flow charts or wiring diagrams can contain branches. However, the meaning of these branches in data flow charts and in wiring diagrams may be different. Wiring diagrams do not deal with jumps (in the sense of a control structure). In this case, an output signal of a measuring device or a signal generator can be fed to several signal inputs of different devices.

Due to the numerous liberties in graphic illustrations of this type, various users have developed different techniques for preparing data flow charts or signal wiring diagrams. Even simple illustrations often require the entire monitor surface. Complex branchings of the connecting arcs can result in interconnection architectures which are difficult to comprehend.

The present invention aims, in particular, to disclose an advantageous additional development of the method for parameterization of a computer program. One specific objective of the invention is to develop an improved method for the configuration and parameterization of a computer program for the operation of a data processing system, which allows a clear illustration of the system for the user and an optimum, simple and less error-prone method to change the configuration, particularly in complex systems.

SUMMARY OF THE INVENTION

One embodiment of the present invention comprises a graphical program development system for developing a graphical program, wherein the development system utilizes a configuration matrix for representing the graphical program. Thus the matrix may graphically illustrate or specify the operation of the computer program. The matrix may comprise columns (or rows) displayed on the display device, including one or more columns which comprise symbols for functional elements and one or more interconnection columns that include interconnections between two or more of the symbols for functional elements. Once the matrix (the computer program) has been created, the computer program may be executed, wherein the computer program executes according to the interconnected symbols for functional elements displayed in the matrix.

The configuration matrix may contain rows and columns that are correspondingly assigned one definite function. The first column, usually the outer left vertical column of the matrix, is designed preferably solely for the accommodation of symbols of the functional elements. This column is referred to as the object column in the following description, wherein the different functional elements (e.g., hardware devices, devices emulated by software or signal conversions carried out by software) are referred to by the common term "functional element" or "object." Thus the term "functional element" may comprise, on one hand, devices which are connected to the data processor via signal or data interfaces, and/or, on the other hand, functional units which are emulated by a software module. The interconnection between two functional elements within the matrix takes place according to fixed specifications. Adjacent to the first column, at least one second interconnection column may be automatically generated, which is divided into different fields. The second interconnection column is proximate to the first column, and preferably parallel to the first column. The fields that lie adjacent to one another form the rows of the matrix. Each row corresponds to a single signal transmission channel.

In order to link two signal transmission channels, a connection may be produced by selecting the two signal transmission channels in the interconnection column by means of the input device, preferably a computer mouse or a computer keyboard. After the input of an interconnection, the interconnection column is prevented from having a second interconnection between other signal transmission channels.

Due to these specifications, an unequivocally defined pattern for producing certain interconnections on the display is provided for the user. In the simplest instance, the two fields which correspond to the signal transmission channels to be connected can be connected to one another by marking the respective fields with a cross in the interconnection column. Since the interconnection column in question can only contain one interconnection, the two markings within an interconnection column are enough to define the interconnection. The matrix is typically designed for defining a signal or data interconnection. If it is intended to define a data flow, indications regarding the direction of data flow may be used. The matrix, is used to specify which signal inputs have access to which output signals stored in a buffer memory. However, it can also be used to write a program in the form of data flow charts. However, in this case, the matrix may optimally be expanded with symbols for illustrating the data flow direction and, in particular, symbols for defining the control functions (loops, conditions).

An interconnection is preferably illustrated by means of lines. A line within a row is defined as a signal transmission channel by the software program for carrying out the method according to one embodiment of the invention, wherein the signal transmission channel ends at the object symbol that lies to the left of the row. A line in a vertical column is unequivocally defined as an interconnection symbol between the two signal transmission channels. In one embodiment arbitrary division and branching as in known data flow charts is not possible. Data connections and data interconnections can only be produced between the rows (signal transmission channels) within the interconnection columns.

Naturally, the vertical and horizontal orientation within the matrix can be interchanged. For example, the object column may also extend horizontally (in this case, the object column should be referred to as an object row instead), wherein the signal transmission channels extend, e.g., downward from the object symbols, and the interconnection columns (or better, rows) extend horizontally between the signal transmission channels.

Preferably, only one empty interconnection column is provided within the matrix. This empty interconnection column is preferably the outermost interconnection column. In this way, it is ensured that every user is able to quickly recognize the location at which new inputs can be made. If an interconnection was produced within an interconnection column, a new empty interconnection column is generated on the display device. If an interconnection within an interconnection column is deleted or terminated, the additionally generated empty interconnection column is removed from the matrix. It is preferable that the free interconnection column to be processed, which does not contain an interconnection, can be identified visually from the other occupied interconnection columns by means of a different background color.

A produced interconnection is preferably illustrated on the display device in the form of lines. A signal line originates from each of the symbols that are linked to one another and extends at least to the interconnection column specified by the user. Within the interconnection column, an interconnection line is illustrated which extends between the two aforementioned signal lines. The signal lines can extend beyond the aforementioned interconnection column, in particular, if additional interconnections are based on these lines. In this case, a monitoring program module within the computer monitors each intended new interconnection and prevents the interconnection if the user attempts to input an already existing interconnection. Similar to data flow charts, a separation or combination of interconnections is possible in the configuration matrix according to one embodiment of the invention. The signals present at a signal output can be fed via various interconnections to different signal lines that lead to different signal inputs on other object symbols or on the same object signal symbol via the signal line that is connected to the symbol of this signal output. Similarly, several signals can be fed to one signal input by forming different interconnections on the same signal line that ends at the symbol for the aforementioned signal input. In contrast to known data flow charts, any interconnection with a signal can be easily located in the configuration matrix because all these interconnections lead to the signal line of the corresponding signal input or output.

In addition to the processing mode that is emphasized in this description, the program according to one embodiment of the invention may be equipped with a blocking mode. In this blocking mode, all changes are blocked by means of the input device. An empty interconnection column is also not displayed in the configuration matrix in this blocking mode. An empty interconnection column for producing an additional interconnection on the display device is only formed once the program is changed over into the edit mode.

In the blocking mode, another form of display may also be selected, e.g., a tree structure that is, e.g., known from the representation of data file directories on a data carrier. Also, in this tree structure, no alteration of the wiring diagram is possible.

As mentioned previously, each object symbol preferably contains several symbols for the signal and data connections of this functional element. If the object column is arranged on the left outer side of the configuration matrix, these symbols should be arranged on the right edge of the object symbol so that a row, which forms a signal transmission channel and in which there is a signal line for the branching of interconnections, borders each connection symbol.

Information regarding the properties of the different connections are preferably stored in data sets—independently of whether this pertains to interfaces of functional elements emulated by the computer or interfaces of external devices. This pertains, for example, to information regarding the type of interface (analog signal source, e.g., measuring sensor or digital data input or output), the data transmission format (serial interface or parallel interface), the transmission protocol of the interface, etc.

The information from the connection data set can be used to produce different illustrations of the connection symbols. The simplest differentiation between different connections is the differentiation between a signal input, a signal output and a bidirectional connection. This differentiation can, for example, be made visible to the eye by arrow symbols or triangular symbols with tips that point in the corresponding direction of the signal flow. If the tip is directed towards the object symbol, this pertains to a signal input. If the tip is directed outward towards the illustration of a signal line, this pertains to a signal output.

The program for carrying out the method according to one embodiment of the invention preferably generates the symbols of the signal and data connections provided in the object column on the display device in an empty interconnection column. This measure simplifies the interconnection. The user merely selects the respective symbols in the empty interconnection column by means of the input device (e.g., a computer mouse) in order to produce the interconnection. Alternatively, the user can also easily select the connection symbols in the object column, wherein the interconnection is registered on the display device in the only free interconnection column in the form of an interconnection line.

A monitoring module of the software for carrying out the method according to one embodiment of the invention compares the data sets of the two linked connections and blocks the interconnection if the connections are not compatible. For example, two signal output connections cannot be linked to one another.

A window with input fields, which is assigned to the object symbol and which allows the adjustment and configuration of parameters of the functional element in question, can be opened by selecting a symbol for a functional element (object) by means of the input device, usually by a double-click on the object symbol. Consequently, all specific characteristics (properties) can be adjusted and altered during processing of the configuration matrix, in particular for internal functional elements emulated by the computer as well as external devices that can be adjusted via the computer. One example to be mentioned in this context is the functional element "3-step controller." The "3-step controller" calculates the deviation from the nominal value and a control variable and also determines the correcting variable. The user is able to input specifications regarding the control parameters in the property window. FIG. 11 shows such a property window for a 3-step controller, however, in connection with a pictograph for a conventional signal wiring diagram.

This should also apply to interconnections. The signal lines can be configured differently for a specific type of interface. With respect to digital (e.g., serial) interfaces, it is, for example, possible to define the number of data bits and the number of stop bits. In addition, it is, e.g., possible to select the data transmission protocol. This information and data are stored in the data sets assigned to the respective interconnections and can be defined or altered in a selectable window with input fields by selecting the interconnection in question (clicking the interconnection line or the signal line of this interconnection with the computer mouse).

The program according to one embodiment of the invention preferably incorporates additional tools that serve for a superior visualization of the different interconnection structures within the entire configuration, and that allow for the processing of a certain subunit of the entire process data processing system.

Thus, the selection of a symbol for a certain functional element by means of the input device, in particular by "clicking" this symbol with the computer mouse, causes only the interconnection lines and signal lines which are connected to this symbol to be highlighted, e.g., in the form of a colored representation. In addition, the symbols connected to the marked symbol are highlighted. In an optional limited processing mode that can be activated by the user, only the highlighted interconnections and symbols can be altered by means of the input device or devices (mouse, keyboard, etc.). This option of limited processing can prevent erroneous inputs in complex structures.

In addition, different object symbols or their connections can be assigned to different levels. One differentiates between fixed levels, which are specified by the program and refer to connections, and levels, which can be specified by the user. The levels that can be defined by the user are referred to as "groups" and arrange functional elements according to the specifications of the user.

The fixed levels may, for example, consist of the following levels:
System Level
This level contains the sequence information. The clock rate or trigger conditions are, e.g., specified in the system level.
Control Level
This level is used to specify events that can be continuously interrogated by a functional element.
Data Level
Single values are processed in this level.
Packet Level
Data packets are processed in this level.

The fixed levels aid the user in the preparation of a diagram. In the processing of process data, one preferred embodiment of the program operates with two different data structures. One of the data structures is a "data packet." A data packet, i.e., a certain quantity of several similar measurement data, is recorded, transmitted and processed. In addition, single values are processed. When operating with "single values," the individual measurement data are continuously acquired and directly available to each functional element (similar to the pressure in a hydraulic system).

Both data structures and the functional elements that process these data structures can only be combined with one another to a limited degree such that two different levels are effectively used in this case.

The formation of "groups" results from the specification of sorting rules. For example, it could be desirable that only the functional elements which are linked with a certain functional element are displayed temporarily in a diagram.

Finally, the method according to one embodiment of the invention should allow a processing step that is already known from the processing of data flow charts and conventional signal wiring diagrams. Several functional elements and the corresponding interconnections should be combined into a new functional unit so that only one object symbol is assigned to this functional unit with the individual functions and interconnections. Interconnections that extend outward from this combination should be linked with functional elements outside of this combination within the matrix on the display device by means of signal lines that are laterally connected to this combined object symbol.

Each combination can be illustrated in a separate matrix on the display device once a corresponding input command is entered by the user. The first functional element of this submatrix is preferably formed by the connections to the functional elements that are not part of the combination and referred to as an "import/export element." All signal transmission channels, which lead from the outside to functional elements within this combination via certain interconnection columns and connected signal transmission channels, originate from these connections. For example, functional units within the entire system can be combined and processed. After the complete configuration of such a unit, this unit is illustrated in the matrix for the entire system as a separate functional element.

Obviously, this combination can be undone through input of an ungroup command. All functional elements of the combination are then placed into the object column of the main matrix again.

In addition, the position of the object symbols and the signal transmission channels as well as the interconnection lines can be sorted through the input of a sort command. This represents one of the major advantages of the configuration matrix in comparison to a conventional data flow chart. In the configuration matrix, all object symbols are arranged in a column. There are no interconnection lines that can be input freely between the object symbols. The interconnections must be produced by means of the defined signal transmission channels in the lines and the interconnection columns adjacent to the functional elements. Resorting the object symbols in the object columns can easily produce a different design of the interconnection lines assigned to these functional elements and a shifting of the signal transmission channels with the program according to one embodiment of the invention. In this case, the length of the interconnection columns is merely adapted to the new position of the respectively rearranged object symbol by the program. Due to this measure, the symbols can be arranged by the user such that a maximum clarity is achieved.

In addition to the method according to one embodiment of the invention, the present application also pertains to a program for carrying out this method as well as to a machine-readable data carrier on which such a program is stored. The required program commands for realizing the respective steps of the method according to one embodiment of the invention may vary depending on the programming language used, the programming tools used and the programming habits of the programmer. However, these program commands should be quite apparent to an experienced system programmer from the previous description of the functions of the method according to one embodiment of the invention.

BRIEF DESCRIPTION OF THE DRAWINGS

One embodiment of the present invention is described below with reference to the enclosed figures.

The figures show.

DETAILED DESCRIPTION OF THE PREFERRED EMBODIMENT

Figure 1:
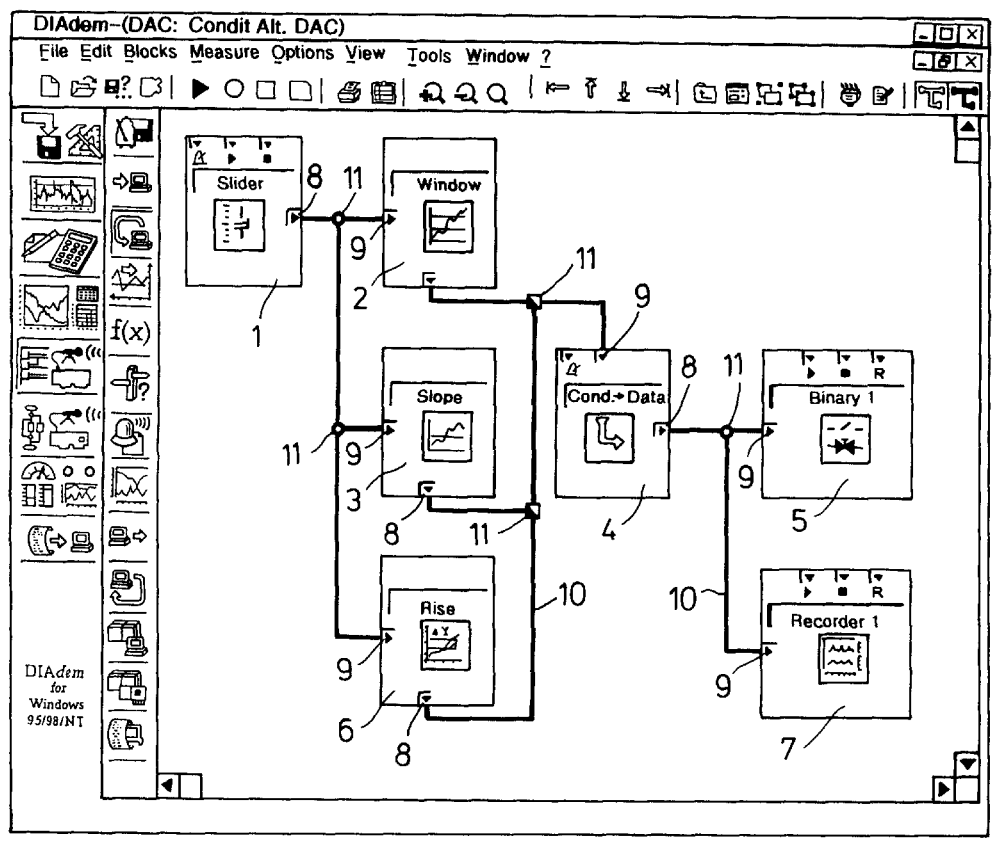
FIG. 1, an illustration of a program window on a display device (monitor), with a signal diagram according to the state of the art that is used to arrange and parameterize the interconnections.

FIG. 1 shows an editor for a signal wiring diagram which is visually similar to the editors for data flow charts described in the initially cited literature and patent application. Each functional element is illustrated in the form of an object symbol 1–7. The object symbol 1 represents a signal generator, wherein the intensity of the signal supplied by the signal generator is indicated by the position of the slide shown on the object symbol 1. The object symbols 2 and 3 represent limiting value or range monitoring elements that determine whether a signal is above or below certain limiting values. The object symbol 6 represents a rising edge condition, i.e., an element that monitors the value of the signal rise over time. The object symbol 4 represents a converter from control signals to data signals. During this conversion, the signals are not altered. They are merely assigned to a new level, namely the data level instead of the control level. The object symbols 5 and 7 represent display elements.

Each object symbol 1–7 contains at least one signal or data connection symbol 8, 9, wherein the connection symbols 8 represent a signal output by means of a triangle with a tip pointed outwards. The connection symbols 9, which contain a triangle with a tip pointed inwards, each represent a signal input. The connection symbols 8, 9 are linked to one another by connecting lines that may contain branches at branching points 11. With this illustration technique, a relatively clear illustration of the measuring system is achieved for the relatively simple diagram shown. Each functional element can be altered and processed by selecting the corresponding object symbol with a suitable input device (usually a computer mouse in connection with a keyboard). It is, in particular, possible to produce interconnections between two connections 8, 9 that can be linked to one another.

Figure 2:
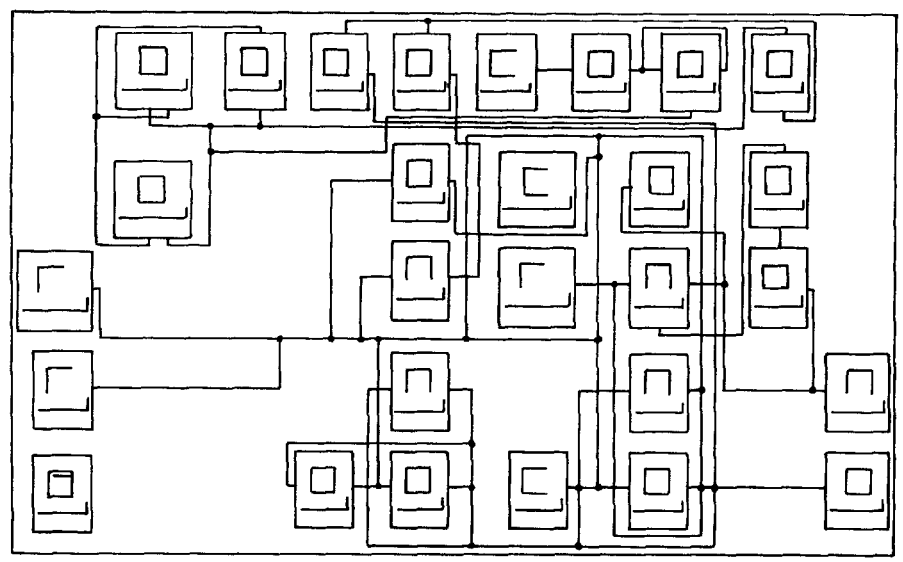
FIG. 2, an illustration of a complex signal diagram on a smaller scale that essentially corresponds to that shown in FIG. 1.

In the illustration of a complex signal wiring diagram shown in FIG. 2, the clarity is already significantly reduced. The different object symbols contain connection symbols at all four edges. The arrangement of an additional connecting line between two arbitrary connection symbols presents, in particular, significant problems. The user spends a significant amount of work time trying to produce a sufficiently clear diagram. Due to the numerous intersections and branches of the connections, there is also the risk of producing undesired connections. An undesired connection to a functional element that is not designed to receive certain data can be produced by connecting a connection with an already existing signal line, if additional branches branch off this signal line.

FIGS. 3–7, 9 and 10 show the monitor displays of one embodiment of an alternative program that only allows the parameterization of the functional elements as well as the interconnections between functional elements in accordance with a strict scheme, so that the user is only able to produce a new interconnection at an arbitrary time at a specified location. The program according to one embodiment of the invention uses a matrix for achieving this advantage. The user is able to input the different functional elements as well as their interconnections into this matrix according to a strictly specified scheme by means of the input device.

In one embodiment, the method and system described herein includes a data processing system, e.g., a computer system, which stores a graphical program development software program for creating graphical programs such as those displayed in FIGS. 3–7, 9 and 10. The computer system may include a processor and a memory medium, wherein the memory medium stores the graphical program development software program, and wherein the processor may execute the graphical program development software program to enable the user to create a graphical program such as is displayed in FIGS. 3–7, 9 and 10.

Figure 3:
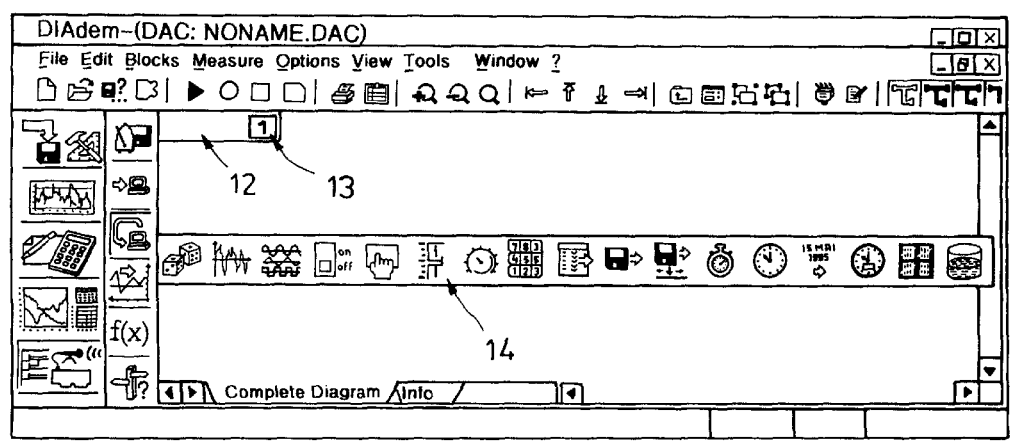
FIG. 3, an illustration of a program window of a program for carrying out the method according to one embodiment of the invention with an empty interconnection matrix.

FIG. 3 shows the basic illustration of an empty matrix in a program window of the computer program according to one embodiment of the invention. The window symbol (registered trademark of Microsoft) in the upper left and adjacent to the word "File" indicates that the program is intended to run under the "Windows" operating system from Microsoft.

The empty configuration matrix comprises a wide left column 12 that is used to accommodate the symbols for the functional elements or object symbols. A significantly narrower column 13 that is used to accommodate an interconnection is arranged to the right, adjacent to the object column 12. Since the matrix is empty in this case, each column 12, 13 merely consists of one field. A selection bar 14 is provided underneath the matrix, and object symbols are inserted into the object column 12 by means of the "drag and drop" method with the computer mouse.

The selection bar 14 contains functional elements that can generate signals, e.g., a random-check generator, a generator for generating a noise, a generator for generating periodic signals and elements for generating signals from user inputs.

Figure 4:
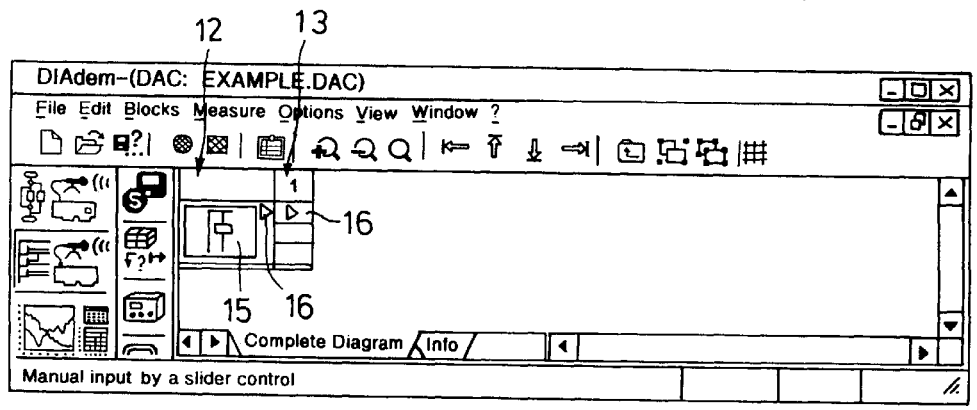
FIG. 4, an illustration with a first object symbol in the object column that corresponds to FIG. 3.

In FIG. 4, a first object symbol 15, in this case, a signal generator with an illustration of a slider, is inserted into the object column 12. The object symbol 15 only has one connection, namely a signal output. This signal output is illustrated by the connection symbol 16 on the right edge of the object symbol 15. The connection symbol 16 is entered into the top field of the vertically extending free interconnection column 13.

Figure 5:
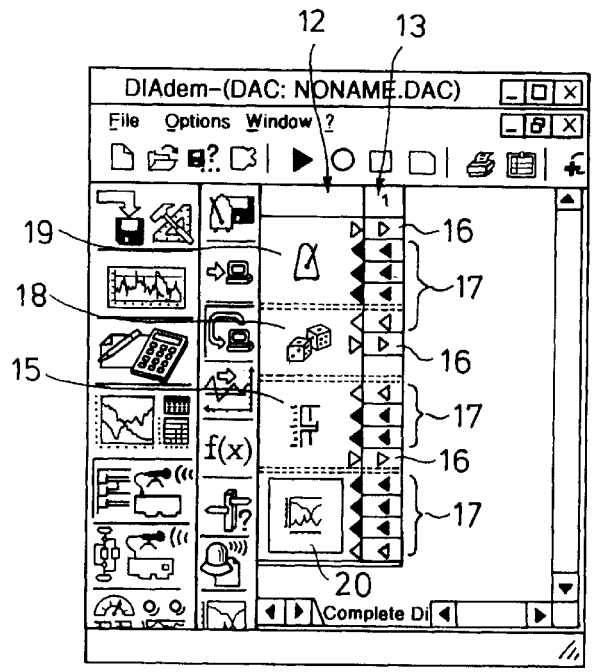
FIG. 5, an illustration with four object symbols in the object column and one free interconnection column that corresponds to FIGS. 3 and 4.

FIG. 5 shows three additional object symbols (18=random number generator, 19=clock generator, 20=signal waveform chart or graph) within the object column 12. The functional elements contain a different number of connections which are each entered on the right edge of the functional elements as well as the empty interconnection column 13. In this case, the only difference is between the symbols 16 for signal outputs and the symbols 17 for signal inputs. The color design of the connection symbols 16, 17 as well as variations in the design of these symbols make it possible to illustrate many different properties (analog or digital interface, number of data bits and stop bits, etc.).

An interconnection in the first interconnection column 13 can be produced by moving the cursor onto a first connection symbol with the computer mouse, pressing the left mouse button at this location and subsequently moving the cursor onto a second connection symbol, at which point the mouse button is released. This may occur on the right edge of the object column 12 as well as in the free interconnection column 13.

Figure 6:
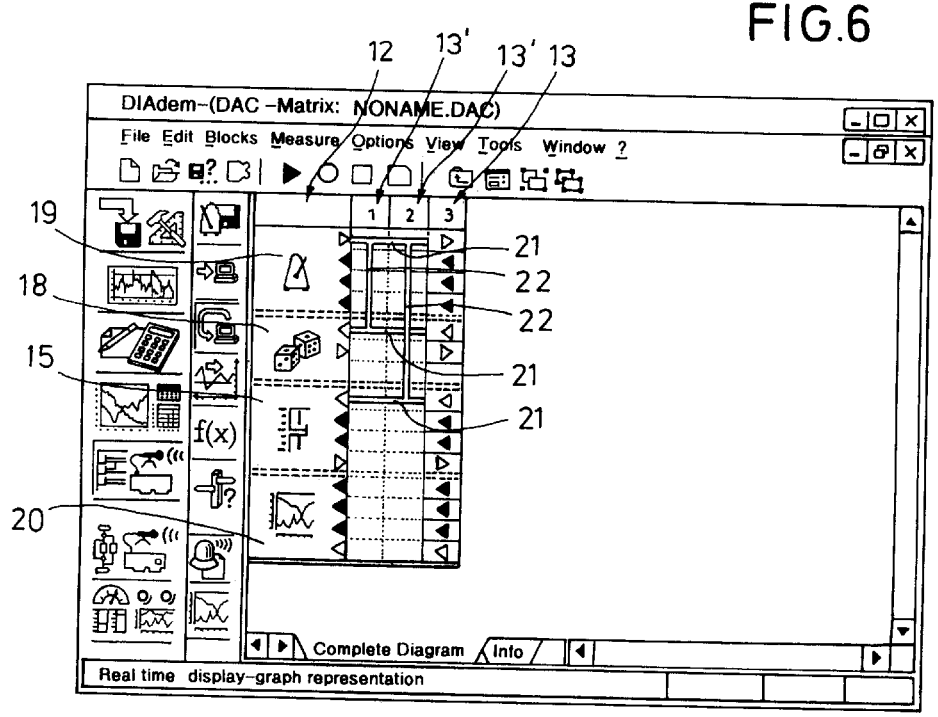
FIG. 6, an illustration with two interconnection columns containing interconnections that corresponds to FIG. 5.
Figure 11:
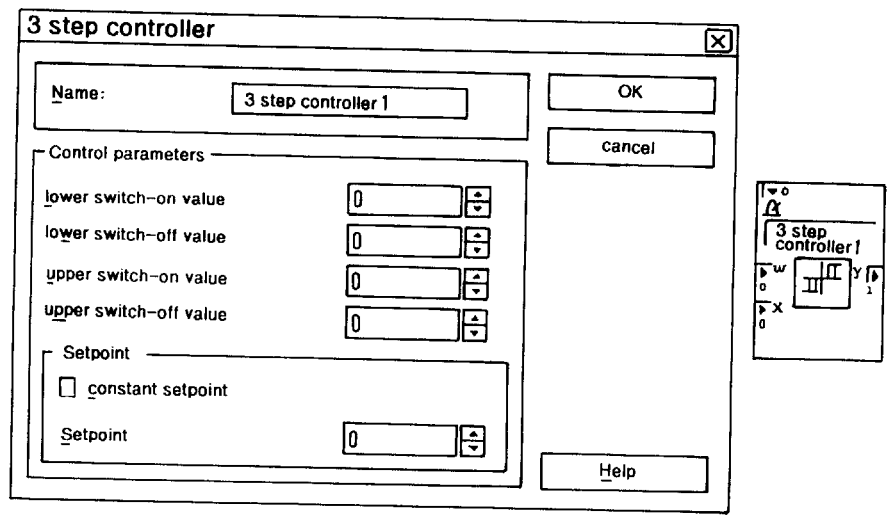
FIG. 11, the previously mentioned illustration of a property window similar to FIG. 7.

For example, if the top connection symbol 16 of the first object symbol 19 is clicked and connected to the upper connection symbol 17 of the second object symbol 18, the interconnection illustrated in the interconnection column with the label number 1 in FIG. 6 is produced. The program according to one embodiment of the invention produces two horizontal signal lines 21 that are connected to the connection symbols in the object column 12 as well as an interconnection line 22 that extends between the signal lines 21. In FIG. 6, two interconnection columns 13' are already occupied by interconnections. In addition to the already mentioned interconnection, an interconnection exists between the top object symbol 19 and the third object symbol 15 for a signal generator in the interconnection column 13' with the label number 2. However, the occupied interconnection columns 13' cannot be used to produce an additional interconnection. Due to this measure, each occupied interconnection column 13' represents a definite interconnection between two connections.

As soon as an interconnection is produced in an interconnection column 13', the computer program according to one embodiment of the invention generates a free interconnection column 13 on the display device. All connection symbols are entered into this interconnection column, and this interconnection column can be used to process the next interconnection. Consequently, the user of the program according to one embodiment of the invention has available a powerful and simple tool for easily inserting and configuring new interconnections at the location specified due to the structure of the interconnection matrix.

Figure 7:
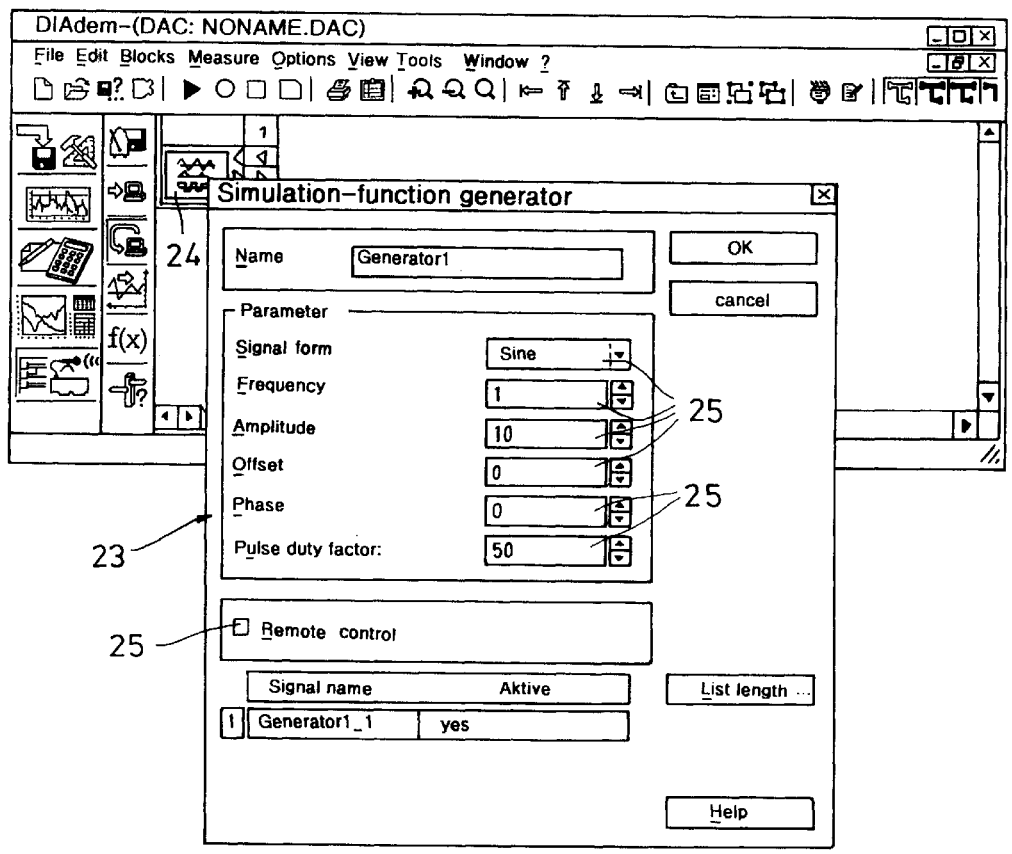
FIG. 7 an additional illustration of the program according to one embodiment of the invention, on the monitor, with a window for the configuration of a functional element.

Similar to systems known from the state of the art, the program according to the present invention also enables a parameterization of the functional elements illustrated by the object symbols 15, 18, 19, 20 as well as the generated interconnections. FIG. 7 shows a window 23 that the program according to one embodiment of the invention illustrates on the display device (monitor) of the computer if the object symbol 24 for the generator is marked with the cursor and selected with the mouse button (e.g., by means of a double click). The window 23 contains differently labeled input fields 25, in which different configuration parameters of the functional element illustrated by the object symbol 24 can be entered and altered. This technique is broadly used in the programming of programs with a graphical user interface GUI and, consequently, it will not be described in greater detail.

Naturally, different windows with different labels for the input fields are preferably provided for the different functional elements.

Similar windows with similar input fields can also be provided for the lines 21 and 22, which represent a defined interconnection. Defined parameters of the signal transmission channels (analog or digital channel, appropriate data transmission protocol, etc.) are entered into these input fields. These entries can be alternatively done in windows that are assigned to the connection symbols.

Figure 8:
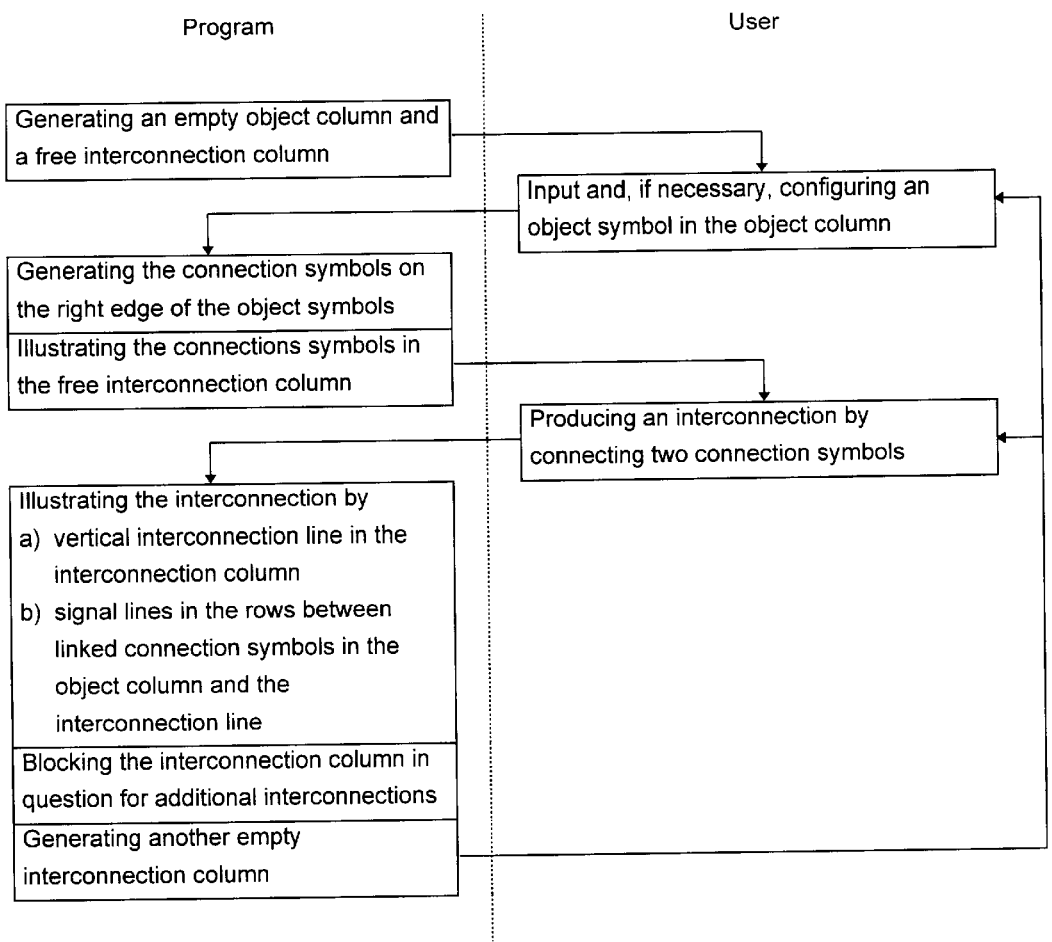
FIG. 8, a simplified flow chart of the processing steps of the program according to one embodiment of the invention in connection with the inputs of the user by means of an input device.

The basic functions of the user interface produced by the program according to one embodiment of the invention can be ascertained from FIG. 8. The user can enter an object symbol into an empty object column generated by the program and configure this object symbol in accordance with the respective requirements or in accordance with the specifications of an external device. Depending on the properties of the selected functional elements, the program according to one embodiment of the invention generates one or more connection symbols on the right edge of the object symbol. Alternatively, the connection symbols can be a fixed component of the object symbol.

These connection symbols are transferred into the first interconnection column generated by the program. It should be noted that the entry of the connection symbols into free interconnection columns is done as an option. The free interconnection column may also be empty, wherein an interconnection is generated solely by connecting the empty fields of the interconnection column or by connecting the connection symbols in the object column. The preferred connection symbols in the free interconnection columns increase the clarity of the configuration matrix according to one embodiment of the invention.

Now the user can produce—as described previously—an interconnection by linking two appropriate connection symbols. Subsequently, the program generates the vertical interconnection line as well as the signal lines between the two ends of the interconnection line and the connection symbols in the object column. The interconnection column in question is then blocked from additional interconnections. Simultaneously, another empty interconnection column, into which the next interconnection can be input by the user, is generated. Alternatively, the user can insert another object symbol so as to expand the system illustrated by means of the matrix.

Figure 9:
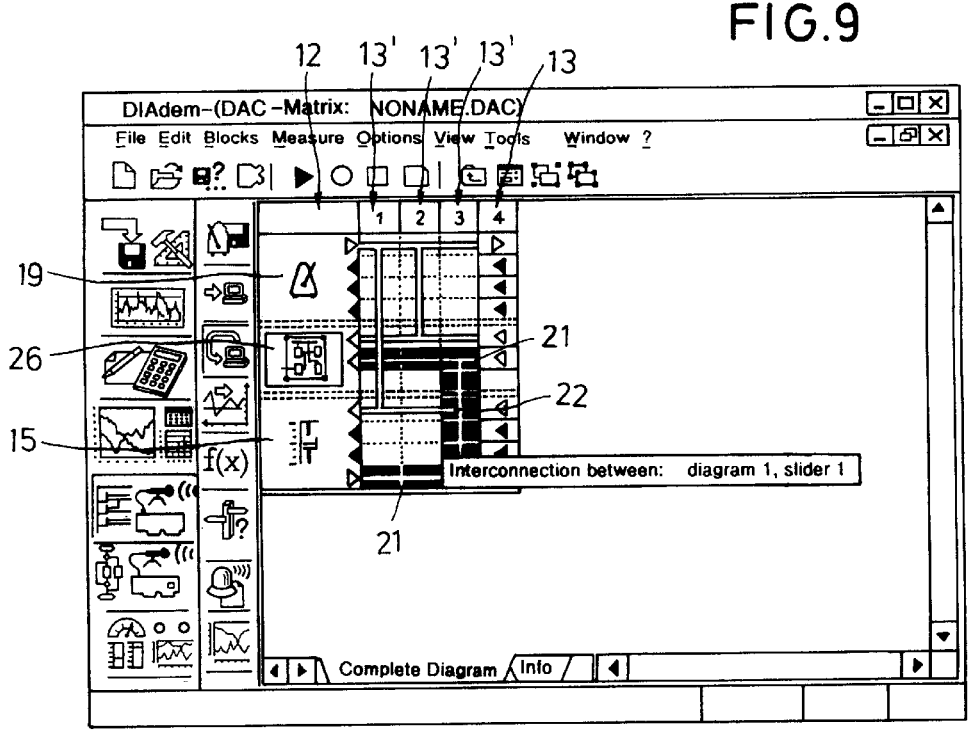
FIG. 9, an additional illustration according to FIGS. 4–6 with a combination of several functional elements.

The program according to one embodiment of the invention may contain additional auxiliary means that are broadly used in the graphical user support to simplify the configuration of the matrix. For example, the pertinent elements of the matrix, on which the computer-mouse controlled cursor is currently located, can be marked with a conspicuous color design by means of the so-called "mouse"over technique. In FIG. 9, the cursor is currently located on a line of the interconnection entered into the interconnection column 13' with the label number 3. The entire interconnection, i.e., the signal lines 21 that originate at both object symbols 15 and 26 as well as the interconnection line 22, are marked with a dark color. This marking may increase the clarity of the matrix. Certain marked areas can also be selected for a limited processing mode by means of the input device (mouse or keyboard). For example, only the interconnection marked by the dark color background in FIG. 9 can be changed in a limited processing mode.

Alternatively, if an element is selected, each interconnection that leads to this element as well as the other functional elements connected to this interconnection can be processed. For example, if the object symbol 15 for the signal generator is selected, the interconnection with a dark background in FIG. 9 as well as the connected object symbol 26 can be released for processing purposes. However, all other object symbols and interconnections of the matrix are blocked from being altered in this limited mode.

The object symbol 26 in FIG. 9 has one other peculiarity. This object symbol does not pertain to a single functional element. The object symbol 26 symbolizes a combination of several object symbols that form an interrelated group. Connection symbols are also provided on the right edge just like the previously described object symbols. These connection symbols represent the connections of the unit, which is identified by the object symbol 26, to the additional functional elements of the matrix. In this case, the individual connections can be arranged in different functional units of the combination 26.

Figure 10:
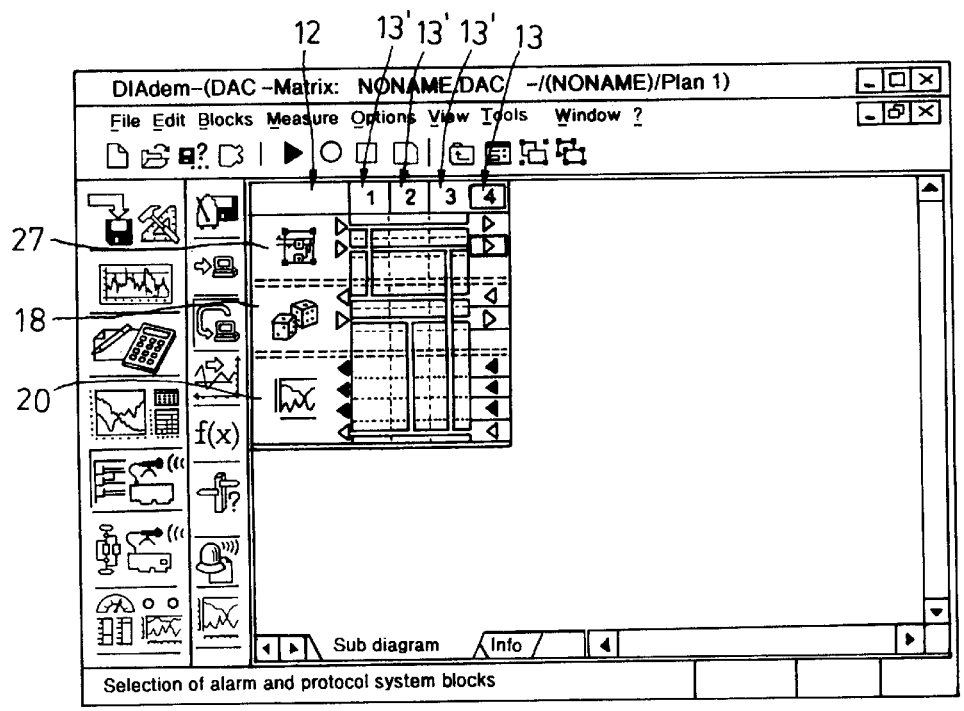
FIG. 10, a subdiagram for the combination of the functional elements shown in FIG. 9.

Finally, FIG. 10 shows a subdiagram for the combined unit identified by the object symbol 26 in the previously described diagram. Analogous to the main matrix, this subdiagram contains an object column 12, a free interconnection column 13 and, if necessary, occupied interconnection columns 13'. The first object symbol 27 represents the connection or the connections to the main matrix and forms an "import/export element." The signal transmission channels identified by the connection symbols lead to two different functional elements in the main matrix as indicated in FIG. 9. The combination in FIG. 10 can be ungrouped by means of an ungroup command and integrated into the main matrix shown in FIG. 9. In this case, the object symbol 26 for the combination and the object symbol 27 for the connections are eliminated.

It is quite apparent that this combination hardly represents a simplification in the simple systems shown. In systems that contain more than 10 and sometimes more than 100 different functional elements, it is very sensible to combine different structurally compatible symbols and, if necessary, process and configure these combinations in subdiagrams.

The method according to one embodiment of the invention, as well as the computer program that operates in accordance with this method, can be additionally simplified and provided with support tools, which have become customary in the programming of user interfaces. For example, error messages that may be generated if an interconnection between two non-compatible connections is attempted cannot only be displayed for visual purposes on the display device, but also in the form of an audible alarm. Explanatory statements cannot only be displayed in text form on the display device, but also in the form of spoken words by means of a loudspeaker if a corresponding speech conversion software module is provided. In addition to conventional input devices, e.g., keyboard, mouse, trackball, touch pad or touch screen, speech input elements consisting of a microphone in connection with a suitable speech recognition software can also be used.

One decisive aspect for realizing the present invention is the creation of a structured configuration and parameterization tool that specifies a fixed arrangement of the functional elements (objects) in the first column of a configuration matrix, as well as the arrangement of the interconnection symbols (interconnection lines) in parallel columns. The user is provided with a new and simple tool that only allows the arrangement of a new interconnection in one interconnection column, namely the free interconnection column. Erroneous inputs are reliably prevented, and the illustration of the matrix ensures a clear illustration of the interconnection by means of the horizontal signal lines.

After the complete preparation of the system structure, the program according to one embodiment of the invention can be switched into a display mode in which the free and programmable interconnection column is deleted such that only the interconnections that were already produced are displayed. In this display mode, the interconnections and the data assigned to the interconnections or the linked functional elements cannot be changed.

List of Reference Numbers
1–7 Object symbols
8 Connection symbol (signal output)
9 Connection symbol (signal input)
10 Connecting line
11 Branching point
12 Object column
13 Interconnection column
14 Selection bar
15 Object symbol (signal generator/slider)
16 Connection symbol
17 Connection symbol
18 Object symbol (random-check generator)
19 Object symbol (clock generator)
20 Object symbol (signal writer)
21 Signal line
22 Interconnection line
23 Window
24 Object symbol (function generator)
25 Input field
26 Object symbol (combination)
27 Object symbol (import/export element)

We claim:
1. A method for creating a computer program for the operation of a data processing system that contains at least one data processor, one data memory, one input device and one display device, wherein the computer program controls functional elements, characterized by the following steps:
generating a matrix which graphically specifies operation of the computer program, wherein the matrix comprises columns displayed on the display device, wherein said generating the matrix comprises:

displaying a first column of the matrix, wherein the first column comprises a plurality of symbols for functional elements;

displaying an interconnection column proximate to the first column that contains fields that each form a row with the fields of adjacent interconnection columns, wherein each row is assigned to one signal transmission channel; and displaying an interconnection between one signal transmission channel and another signal transmission channel within the interconnection column in accordance with user input, wherein the interconnection operates to connect two or more of the symbols for functional elements;

wherein the computer program comprises a plurality of interconnected symbols, including said two or more of the symbols and a plurality of interconnections, including said interconnection, wherein the plurality of interconnected symbols graphically represents the functionality of the computer program, and wherein the computer program is executable according to the interconnected symbols for the functional elements represented in the matrix.

2. The method according to claim 1, wherein the interconnection column is blocked against a second interconnection between other signal transmission channels.

3. The method according to claim 1, further comprising:
executing the computer program, wherein the computer program executes according to the interconnected symbols for functional elements displayed in the matrix.

4. The method according to claim 1, wherein said displaying the interconnection column comprises displaying the interconnection column parallel to the first column.

5. The method according to claim 1, wherein said displaying the interconnection column comprises:

displaying a plurality of interconnection columns proximate to the first column, wherein the plurality of interconnection columns comprise fields that each form a row with the fields of adjacent interconnection columns, wherein each row includes at least one signal transmission channel, and displaying an interconnection between one signal transmission channel and another signal transmission channel within an interconnection column in accordance with user input.

6. The method according to claim 1, further comprising:
displaying a new interconnection column after the arrangement of an interconnection in the interconnection column, wherein the new interconnection column is displayed adjacent to the interconnection column.

7. The method according to claim 1, further comprising:
deleting an interconnection in the interconnection column;
wherein an empty interconnection column is deleted from the matrix on the display device after the deletion of this interconnection.

8. The method according to claim 1, wherein an interconnection is illustrated on the display device by means of lines, namely by two signal lines in the rows that extend from the two connected symbols to the interconnection column, as well as one interconnection line that extends between the two signal lines in the interconnection column.

9. The method according to claim 8, characterized in that a window with input fields is activated on the display device by selecting an interconnection line, a signal line or a connection symbol of a certain interconnection by means of the input device, wherein adjustment and configuration data of the pertinent interconnection is input in this window.

10. The method according to claim 8, characterized in that, if a symbol for a certain functional element is selected by means of the input device, all interconnection lines and signal lines connected to this symbol, as well as all symbols of additional functional elements linked to this symbol, are optically highlighted on the display device.

11. The method according to claim 10, characterized in that only the optically highlighted interconnections and symbols are released for processing and changing of the assigned data by means of the input device, wherein the processing of all other interconnections and symbols is blocked.

12. The method according to claim 1, characterized in that all empty interconnection columns are deleted from the matrix on the display device in a blocking mode, and that the symbols of the functional elements arranged in the first column, as well as the symbols of the interconnections, are blocked from being altered by the input device.

13. The method according to claim 1, characterized in that each symbol of a functional element illustrated in the first column is assigned at least one symbol for a connection of this element, wherein the connection symbol is arranged adjacent to the signal transmission channel leading to this connection in the matrix.

14. The method according to claim 13, characterized in that a data set in the data memory is assigned to each signal or data connection, wherein said data set contains properties including one or more of transmission direction, transmission format, and transmission mode.

15. The method according to claim 14, characterized in that the connection symbol is designed in accordance with the content of the assigned data set.

16. The method according to claim 15, characterized in that all connection symbols from the object column are illustrated in the fields of an empty interconnection column.

17. The method according to claim 14, characterized in that a monitoring function of the data processor only allows the interconnection between one connection symbol and a second connection symbol if a comparison of the data sets of both connections, which is carried out by the data processor, indicates that the transmission of data or signals from one connection to the other connection is possible.

18. The method according to claim 1, characterized in that a window with input fields is activated on the display device by selecting a symbol for a functional element by means of the input device, wherein adjustment and configuration data of the pertinent functional element is input in this window.

19. The method according to claim 1, characterized in that each symbol for a certain functional element and the corresponding connection symbols can be assigned to a definable group or specified level, wherein all symbols and interconnections assigned to this group or level are optically highlighted on the monitor through the selection of one group or level by means of the input device.

20. The method according to claim 19, characterized in that the group is specified based on the properties of this element.

21. The method according to claim 19, characterized in that the level is specified based on the properties of the signals processed by the respective functional element.

22. The method according to claim 19, characterized in that the group can be freely specified by the user.

23. The method according to claim 19, characterized in that, after selecting a level by means of the input device, only the symbols of the functional element assigned to this level and the interconnections assigned to these elements are released for processing and changing of the assigned data by means of the input device.

24. The method according to claim 19, characterized in that, after selecting a level by means of the input device, the interconnections that do not belong to this level are no longer displayed on the display device.

25. The method according to claim 1, characterized in that several symbols of functional elements in the first column can be selected by means of the input device and combined by the input of a combination command, wherein the combination is illustrated in the form of a combination symbol in one field of the first column, and the interconnections to the symbols of functional elements that are not contained in the combination are displayed on the display device in the form of lines in the rows and in the interconnection columns of the matrix.

26. The method according to claim 25, characterized in that the combination can be illustrated on the display device in a separate matrix, wherein the first functional element in the first column of this matrix represents the connections to the functional elements that are not contained in this combination, and contains symbols for signal transmission channels to the functional elements that are not contained in this combination.

27. The method according to claim 25, characterized in that a combination of symbols can be broken into the individual symbols by the input of an ungroup command by means of the input device.

28. The method according to claim 1, characterized in that the position of all symbols and lines is sorted within the matrix on the display device in accordance with fixed specifications or user specifications by the input of a sort command.

29. The method according to claim 1, characterized in that the columns extend vertically and the rows extend horizontally on the display device.

30. The method according to claim 1, characterized in that the rows extend vertically and the columns extend horizontally on the display device.

31. The method according to claim 1, characterized in that a parameterization data set for a program to control a data processing system is prepared from the symbols of functional elements that are input into the first column of the matrix and the data sets assigned to these symbols, as well as from the interconnections input into the additional columns of the matrix and the data sets assigned to these symbols.

32. A system for creating a computer program, comprising:
    at least one data processor;
    a memory, wherein the memory stores a graphical program development software program which is executable for creating the computer program;
    an input device; and
    a display device;
    wherein the graphical program development software program is executable by the processor to generate a matrix which graphically specifies operation of the computer program, wherein the matrix comprises columns displayed on the display device, wherein, in generating the matrix, the processor is operable to:
        display a first column of the matrix, wherein the first column comprises a plurality of symbols for functional elements;
        display an interconnection column proximate to the first column that contains fields that each form a row with the fields of adjacent interconnection columns, wherein each row is assigned to one signal transmission channel; and
        display an interconnection between one signal transmission channel and another signal transmission channel within the interconnection column in accordance with user input, wherein the interconnection operates to connect two or more of the symbols for functional elements;
    wherein the computer program comprises a plurality of interconnected symbols, including said two or more of the symbols and a plurality of interconnections, including said interconnection, wherein the plurality of interconnected symbols graphically represents the functionality of the computer program, and wherein the computer program is executable according to the interconnected symbols for functional elements displayed in the matrix.

33. The system according to claim 32, wherein the interconnection column is blocked against a second interconnection between other signal transmission channels.

34. The method according to claim 32, wherein displaying the interconnection column comprises displaying the interconnection column parallel to the first column.

35. The method according to claim 32, wherein, in displaying the interconnection column, the processor is operable to:
    display a plurality of interconnection columns proximate to the first column, wherein the plurality of interconnection columns comprise fields that each form a row with the fields of adjacent interconnection columns, wherein each row includes at least one signal transmission channel, and
    display an interconnection between one signal transmission channel and another signal transmission channel within an interconnection column in accordance with user input.

36. A memory medium comprising program instructions for creating a computer program, wherein the computer program controls functional elements, wherein the program instructions are executable to implement:
    generating a matrix which graphically specifies operation of the computer program, wherein the matrix comprises columns displayed on the display device, wherein said generating the matrix comprises:
        displaying a first column of the matrix, wherein the first column comprises a plurality of symbols for functional elements;
        displaying an interconnection column proximate to the first column that contains fields that each form a row with the fields of adjacent interconnection columns, wherein each row is assigned to one signal transmission channel; and
        displaying an interconnection between one signal transmission channel and another signal transmission channel within the interconnection column in accordance with user input, wherein the interconnection operates to connect two or more of the symbols for functional elements;
    wherein the computer program comprises a plurality of interconnected symbols, including said two or more of the symbols and a plurality of interconnections, including said interconnection, wherein the plurality of interconnected symbols graphically represents the functionality of the computer program, and wherein the computer program is executable according to the interconnected symbols for the functional elements represented in the matrix.

37. The memory medium according to claim 36 wherein the interconnection column is blocked against a second interconnection between other signal transmission channels.

38. The memory medium according to claim 36, wherein the program instructions are further executable to implement:

executing the computer program, wherein the computer program executes according to the interconnected symbols for functional elements displayed in the matrix.

39. A memory medium which stores a graphical computer program, wherein the graphical computer program controls functional elements, wherein the graphical computer program comprises:

a matrix which graphically specifies operation of the computer program, wherein the matrix comprises columns displayed on a display device, wherein the matrix comprises:

a first column of the matrix, wherein the first column comprises a plurality of symbols for functional elements;

an interconnection column proximate to the first column that contains fields that each form a row with the fields of adjacent interconnection columns, wherein each row is assigned to one signal transmission channel; and an interconnection between one signal transmission channel and another signal transmission channel within the interconnection column in accordance with user input, wherein the interconnection operates to connect two or more of the symbols for functional elements;

wherein the graphical computer program comprises a plurality of interconnected symbols, including said two or more of the symbols and a plurality of interconnections, including said interconnection, wherein the plurality of interconnected symbols graphically represents the functionality of the computer program, and wherein the computer program is executable according to the interconnected symbols for the functional elements represented in the matrix.

40. A method for the configuration and parameterization of a computer program for the operation of a data processing system that contains at least one data processor, one data memory, one input device and one display device, wherein the computer program controls functional elements, characterized by the following steps:

a) generating a first column of a matrix with columns and rows that are perpendicular to one another on the display device, wherein the first column contains at least one field for accommodating a symbol for a functional element that can be input by means of the input device, b) generating an interconnection column that is parallel to the first column and contains fields that each form a row with the fields of adjacent interconnection columns, wherein each row is assigned to one signal transmission channel, and c) generating an interconnection between one signal transmission channel and another signal transmission channel within an interconnection column in accordance with user inputs by means of the input device, the interconnection being displayed in the interconnection column on the display device, and this interconnection column being blocked against a second interconnection between other signal transmission channels;

wherein said matrix, when configured with a plurality of symbols and a plurality of interconnections, including said interconnection, comprises the computer program, wherein the computer program is executable according to the interconnected symbols for the functional elements represented in the matrix.

\* \* \* \* \*